United States Patent
Amiel et al.

(10) Patent No.: US 8,347,112 B2
(45) Date of Patent: Jan. 1, 2013

(54) ENCRYPTION/DECRYPTION ENGINE WITH SECURE MODES FOR KEY DECRYPTION AND KEY DERIVATION

(75) Inventors: Frederic P. R. Amiel, Antibes (FR); Aymeric S. Vial, Antibes (FR); Jean-Yves Simon, St. Laurent de Var (FR)

(73) Assignee: Texas Instruments Incorporated, Dallas, TX (US)

( * ) Notice: Subject to any disclaimer, the term of this patent is extended or adjusted under 35 U.S.C. 154(b) by 476 days.

(21) Appl. No.: 12/372,030

(22) Filed: Feb. 17, 2009

(65) Prior Publication Data

US 2009/0282264 A1    Nov. 12, 2009

(30) Foreign Application Priority Data

May 8, 2008    (EP) ..................................... 08290439

(51) Int. Cl.
*G06F 11/30* (2006.01)

(52) U.S. Cl. .......... 713/189; 713/162; 713/165; 726/26; 726/34; 380/44; 380/201; 380/259

(58) Field of Classification Search ........................ None
See application file for complete search history.

(56) References Cited

U.S. PATENT DOCUMENTS

| | | | |
|---|---|---|---|
| 2002/0095382 A1* | 7/2002 | Taoka et al. | 705/50 |
| 2003/0110382 A1* | 6/2003 | Leporini et al. | 713/172 |
| 2006/0056620 A1* | 3/2006 | Shingal et al. | 380/28 |
| 2006/0129848 A1* | 6/2006 | Paksoy et al. | 713/193 |
| 2008/0162947 A1* | 7/2008 | Holtzman et al. | 713/193 |

* cited by examiner

*Primary Examiner* — Shewaye Gelagay
(74) *Attorney, Agent, or Firm* — Ronald O. Neerings; Wade James Brady, III; Frederick J. Telecky, Jr.

(57) ABSTRACT

In at least some embodiments, an electronic device comprises a processor and an encryption/decryption (E/D) engine coupled to the processor via a bus. The E/D engine selectively operates in a first mode and a second mode. For the first mode, an E/D engine output is provided to the bus. For the second mode, the E/D engine output is not provided to the bus and is accessible only to the E/D engine.

16 Claims, 5 Drawing Sheets

ENCRYPTION/DECRYPTION ENGINE WITH SECURE MODES FOR KEY DECRYPTION AND KEY DERIVATION

CROSS-REFERENCE TO RELATED APPLICATIONS

The present application claims priority to EP patent application Serial No. 08290439.2, filed May 8, 2008, entitled "Hardware Protection For Key Deciphering" and hereby incorporated herein by reference.

BACKGROUND

Key decryption (e.g., an AES key) and key derivation are intrinsically sensitive processes. An attacker may seek to retrieve the value of an encrypted key ($K_{encrypted}$) using a hostile application, a software security hole or by directly reading its value from an external memory. Once $K_{encrypted}$ is known, the value of the encryption key (K) can be obtained from $K_{encrypted}$ by performing the reverse operation used to generate $K_{encrypted}$. In key derivation, a key for a given need or application ($K_{APP}$) is derived. An attacker may seek to retrieve the value of $K_{APP}$ using a hostile application, a software security hole or by directly reading its value by snooping data transferred on a bus. Preventing exposure of K, $K_{APP}$ or other sensitive data is desirable.

SUMMARY

In at least some embodiments, an electronic device comprises a processor and an encryption/decryption (E/D) engine coupled to the processor via a bus. The E/D engine selectively operates in a first mode and a second mode. For the first mode, an E/D engine output is provided to the bus. For the second mode, the E/D engine output is not provided to the bus and is accessible only to the E/D engine.

In at least some embodiments, security logic comprises an E/D engine having a data input line, a data output line, and a key input line. The security logic further comprises output restriction logic coupled to the data output line. The output restriction logic selectively prevents an E/D engine output from being forwarded outside the security logic and redirects the E/D engine output to a feedback loop between the data output line and the key input line.

In at least some embodiments, a method for E/D engine modes comprises determining if a first secure mode is selected. If the first secure mode is selected, the method comprises diversifying a key and providing the diversified key as an input key to the E/D engine.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document doe not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Embodiments of the invention protect key values from bus eavesdropping or recovery during key derivation and/or key decryption. In accordance with at least some embodiments, an encryption/decryption (E/D) engine operates in various modes including at least one non-restricted mode and at least two secure modes. In a first secure mode, an application key ($K_{app}$) is derived by the E/D engine and is retained in a localized secure storage (e.g., a register) for subsequent access only by the E/D engine. In a second secure mode, key encryption or key decryption of a previously derived key is selectively performed by the E/D engine. If key decryption is performed, the decrypted key is retained in the localized secure storage for subsequent access only by the E/D engine. In accordance with embodiments, if a key is used for a non-restricted mode, that key cannot be used for any secure modes. Thus, at least some embodiments implement key diversification to modify an existing key used with a non-restricted mode for use with a secure mode.

Figure 1:
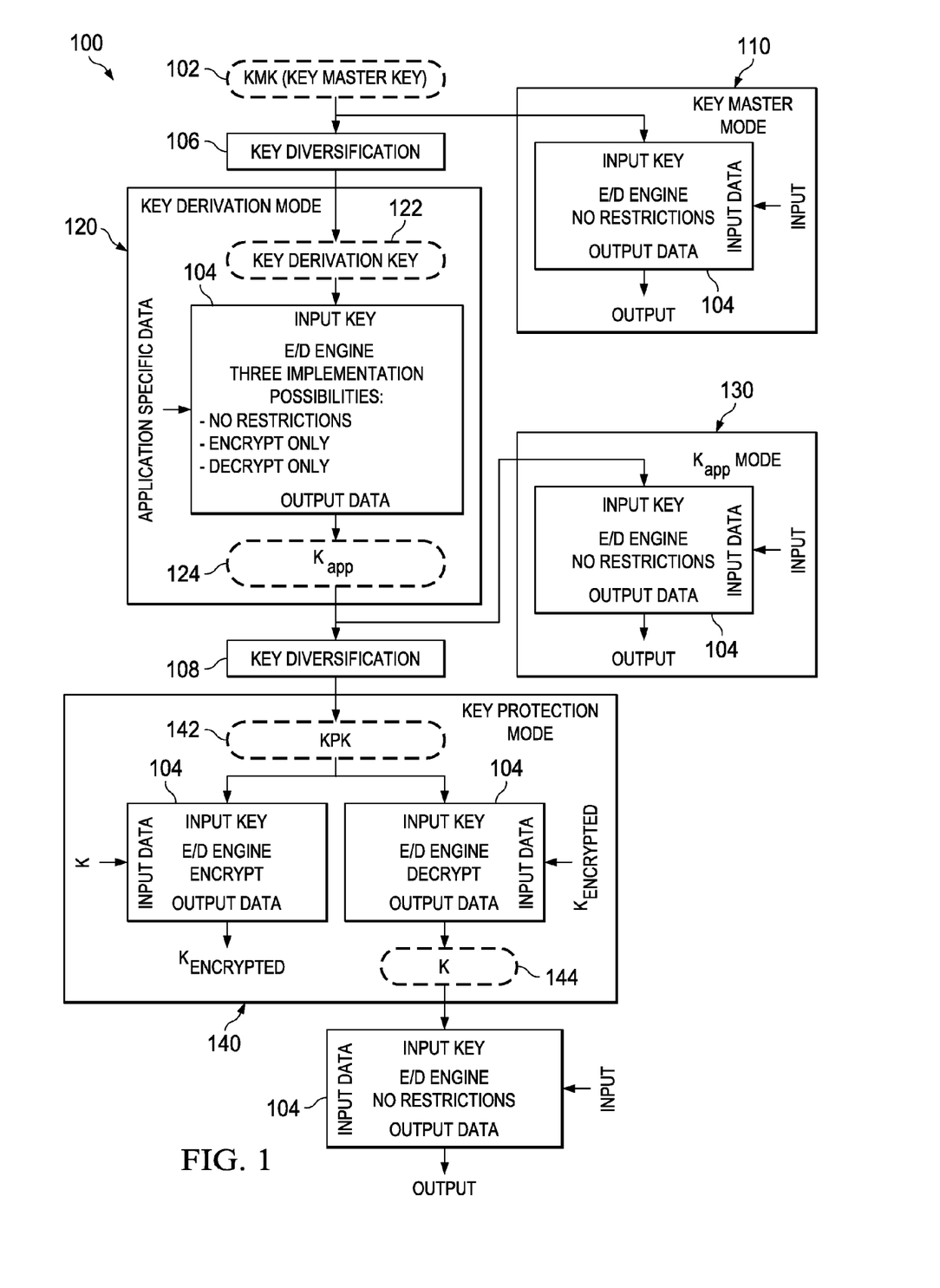
FIG. 1 shows a mode chart for an encryption/decryption (E/D) engine in accordance with an embodiment of the disclosure.

FIG. 1 shows a mode chart 100 for an encryption/decryption (E/D) engine 104 in accordance with an embodiment of the disclosure. The mode chart 100 illustrates various E/D engine modes referred to as a "key master mode" 110, a "key derivation mode" 120, a "$K_{app}$ mode" 130, and a "key protection mode" 140. The key master mode 110 and the $K_{app}$ mode 130 correspond to non-restricted modes of the E/D engine 104. Meanwhile, the key derivation mode 120 and the key protection mode 140 correspond to secure modes of the E/D engine 104. In the various modes, the E/D engine 104 receives input data and provides output data by operating on the input data (e.g., performing encryption or decryption) based on an input key. In other words, the output data of the E/D engine 104 is an encrypted or decrypted version of the input data.

In the key master mode 110, the E/D engine 104 operates on input data based on a received key master key (KMK) 102 as the input key. In the key master mode 110, there are no restrictions (e.g., encrypt only or decrypt only) to the operations of the E/D engine 104.

In the key derivation mode 120, a key derivation key (KDK) 122 is provided to the E/D engine 104 as the input key. In the embodiment of FIG. 1, KDK 122 is intentionally diversified from KMK 102. For example, KDK 122 may be obtained by passing KMK 102 through a key diversification step 106. In accordance with at least some embodiments, the key diversification step 106 involves XORing the value of KMK 102 with a non-null value. During the key derivation mode 120, the E/D engine 104 derives an application key ($K_{app}$) 124 by using KDK 122 as the input key and by receiving application-specific data as input data. The security of $K_{app}$ 124 can be ensured, for example, by avoiding exposure of $K_{app}$ 124 to external busses and by storing $K_{app}$ 124 in a localized secure storage that is available only to the E/D engine 104. During the key derivation mode 120, the E/D engine 104 selectively operates in an "encrypt-only mode", a "decrypt-only mode", or a "no restrictions mode".

In the $K_{app}$ mode 130, $K_{app}$ 124 is provided to the E/D engine 104 as the input key. In accordance with at least some embodiments, during the $K_{app}$ mode 130, $K_{app}$ 124 is retrieved as needed from a localized secure storage that is only accessible to the E/D engine 104. In the $K_{app}$ mode 130, there are no restrictions (e.g., encrypt only or decrypt only) to the operations of the E/D engine 104.

In the key protection mode 140, a key protection key (KPK) 142 is provided to the E/D engine 104 as the input key. In the embodiment of FIG. 1, KPK 142 is intentionally diversified from $K_{app}$ 124. For example, KPK 142 may be obtained by passing $K_{app}$ 124 through a key diversification step 108. In accordance with at least some embodiments, the key diversification step 108 involves XORing the value of $K_{app}$ 124 with a non-null value. During the key protection mode 140, the E/D engine 104 either encrypts or decrypts another key. As an example, when performing an encryption, the E/D engine 104 may receive a key (K) and output an encrypted version ($K_{encrypted}$) (e.g., $K_{encrypted}$=Encrypt[KPK](K)). Alternatively, when performing a decryption, the E/D engine 104 may receive an encrypted key $K_{encrypted}$ and output a decrypted version K 144 (e.g., K=Decrypt[KPK]($K_{encrypted}$)). The security of K 144 can be ensured, for example, by avoiding exposure of K 144 to external busses and by storing K 144 in a localized secure storage that is available only to the E/D engine 104. K 144 may subsequently be retrieved as needed from the localized secure storage for use with a non-restricted mode of the E/D engine 104.

Although FIG. 1 describes KMK 102 as being used with the key master mode 110, KDK 122 as being used with the key derivation mode 120, $K_{app}$ 122 as being used with the $K_{app}$ mode 130, and KPK 142 as being used with the key protection mode 140, other embodiments are possible. For example, in alternative embodiments, KMK 102 is used with the key derivation mode 120 and KDK 122 is used with the key master mode 110. In such case, the key diversification step 106 diversifies KMK 102 (generating KDK 122) for the key master mode 110 instead of for the key derivation mode 120. Similarly, in alternative embodiments, $K_{app}$ 124 is used for the key protection mode 140 and KPK 142 is used for the $K_{app}$ mode 130. In such case, the key diversification step 108 diversifies $K_{app}$ 124 (generating KPK 142) for the $K_{app}$ mode 130 instead of for the key protection mode 140.

Figure 2A:
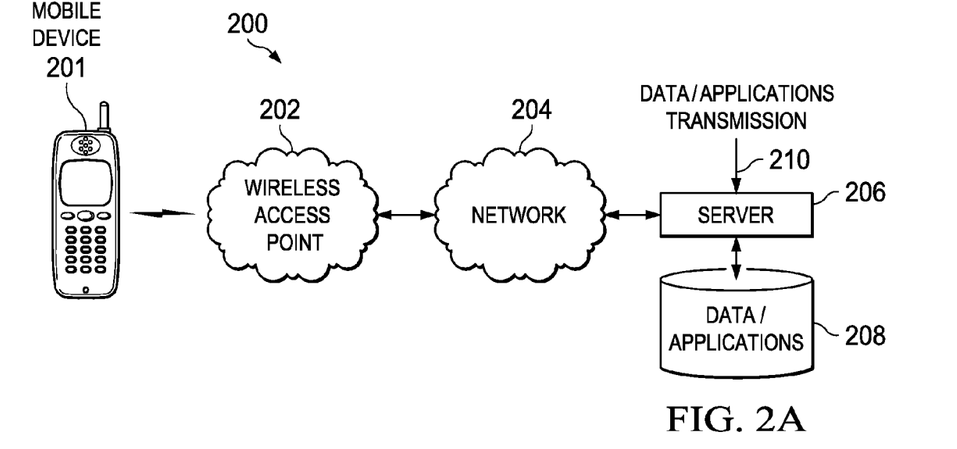
FIG. 2A shows a system in accordance with an embodiment of the disclosure.

An E/D engine with modes such as those described for FIG. 1 may be implemented in a variety of systems and/or electronic devices. FIG. 2A shows a system 200 in accordance with embodiments of the disclosure. As shown in FIG. 2A, the system 200 comprises a wireless mobile device 201 in communication with a server 206 via a wireless access point 202 and a network 204. In at least some embodiments, the mobile device 201 and/or the server 206 implements E/D operations to protect sensitive data and/or keys related to data/applications accessible to the mobile device 201 or the server 206. As an example, the server 206 may have access to data/applications stored in a database 208 or available as transmissions 210. Likewise, the mobile device 201 may have access to the same data/applications or different data/applications. In either case, E/D operations are performed to improve security of sensitive data related to such data/applications.

In accordance with embodiments, the mobile device 201 may be any portable device configured to connect to the wireless access point 202. Such portable devices include, but are not limited to, a cellular telephone, a personal digital assistant (PDA), a web tablet, a pocket personal computer, a laptop computer, etc. In at least some embodiments, the mobile device 201 is compatible with Third Generation Partnership Project (3GPP) protocols. Other communication protocols are possible as well.

Figure 2B:
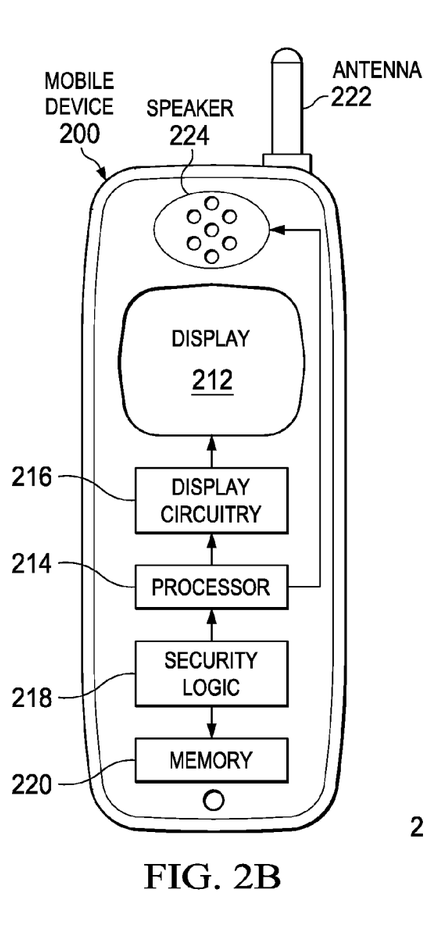
FIG. 2B shows an illustrative architecture for the mobile device of FIG. 2A.

FIG. 2B shows an illustrative architecture for the mobile device 201 of FIG. 2A. The mobile device 201 comprises an antenna 222 for broadcasting wireless signals to and/or receiving wireless signals from other devices (e.g., the wireless access point 202). The mobile device 201 also comprises user interface components such as a speaker 224 and a display 212 that renders video frames and other images from display circuitry 216.

The mobile device 202 also comprises at least one processor 214, which may correspond to at least one of a variety of semiconductor devices such as microprocessors, microcontrollers, central processor units (CPUs), main processing units (MPUs), digital signal processors (DSPs), advanced reduced instruction set computing (RISC) machines, ARM processors, application specific integrated circuits (ASICs), field programmable gate arrays (FPGAs) or other processing devices. The processor 214 performs a set of predetermined operations based on data/instructions stored in or accessible to the processor 214. In at least some embodiments, the processor 214 couples to a memory 220 that stores data/instructions for use by the processor 214.

Figure 2C:
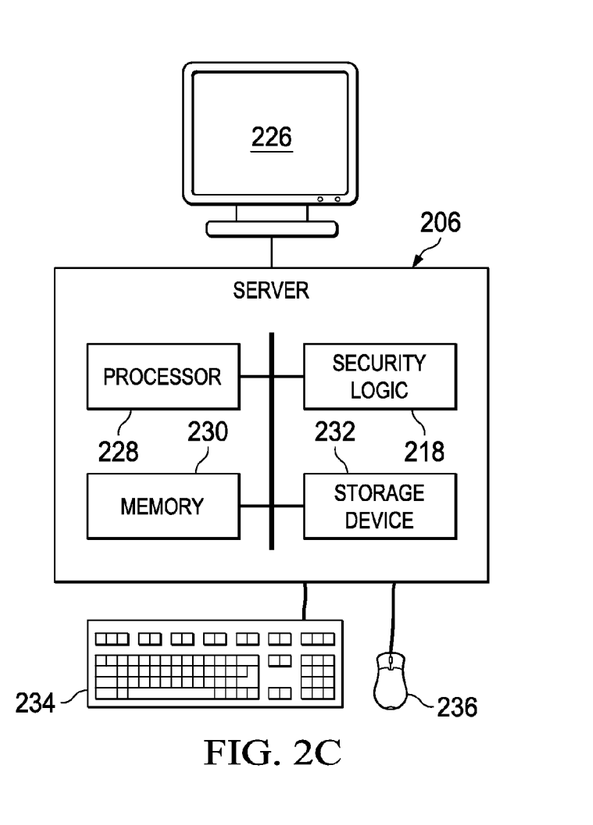
FIG. 2C shows an illustrative architecture for the server of FIG. 2A.

FIG. 2C shows an illustrative architecture for the server 206 of FIG. 2A. The server 206 may be any type of computer platform configured to operate as a server on the network 204. The network 204 may correspond to a Local Area Network (LAN), a Wide Area Network (WAN) such as the Internet, or other network configurations. As shown in FIG. 2C, the server 206 comprises a processor 228, a system memory 230 and a storage device 232 (e.g., hard drives). Although not required, the server 206 also may include input devices, such as a keyboard 234 and a mouse 236, and output devices such as a monitor 226. The server 206 also may comprise numerous other components typical of network servers (not shown).

In accordance with embodiments, the mobile device 201 and/or the server 206 comprises security logic 218, which includes the E/D engine 104 and corresponding mode logic to enable the E/D engine 104 to operate in various non-restricted modes and secure modes. As previously described, the secure modes prevent exposure of keys during key derivation and/or key decryption. Also, the secure modes rely on input keys that are diverse from any non-restricted mode keys. Although other locations are possible, for the mobile device 201, the security logic 218 may be placed between the processor 214 and other components (e.g., the memory 220). Similarly, for the server 206, the security logic 218 may be placed between the processor 228 and other components (e.g., the memory 230 and/or the storage device 232). In other words, the security logic 218 may be associated with a particular processor to provide security operations (encryption/decryption) for incoming processor data or outgoing processor data. Representative examples of the security logic 218 are given in FIGS. 3 and 4.

Figure 3:
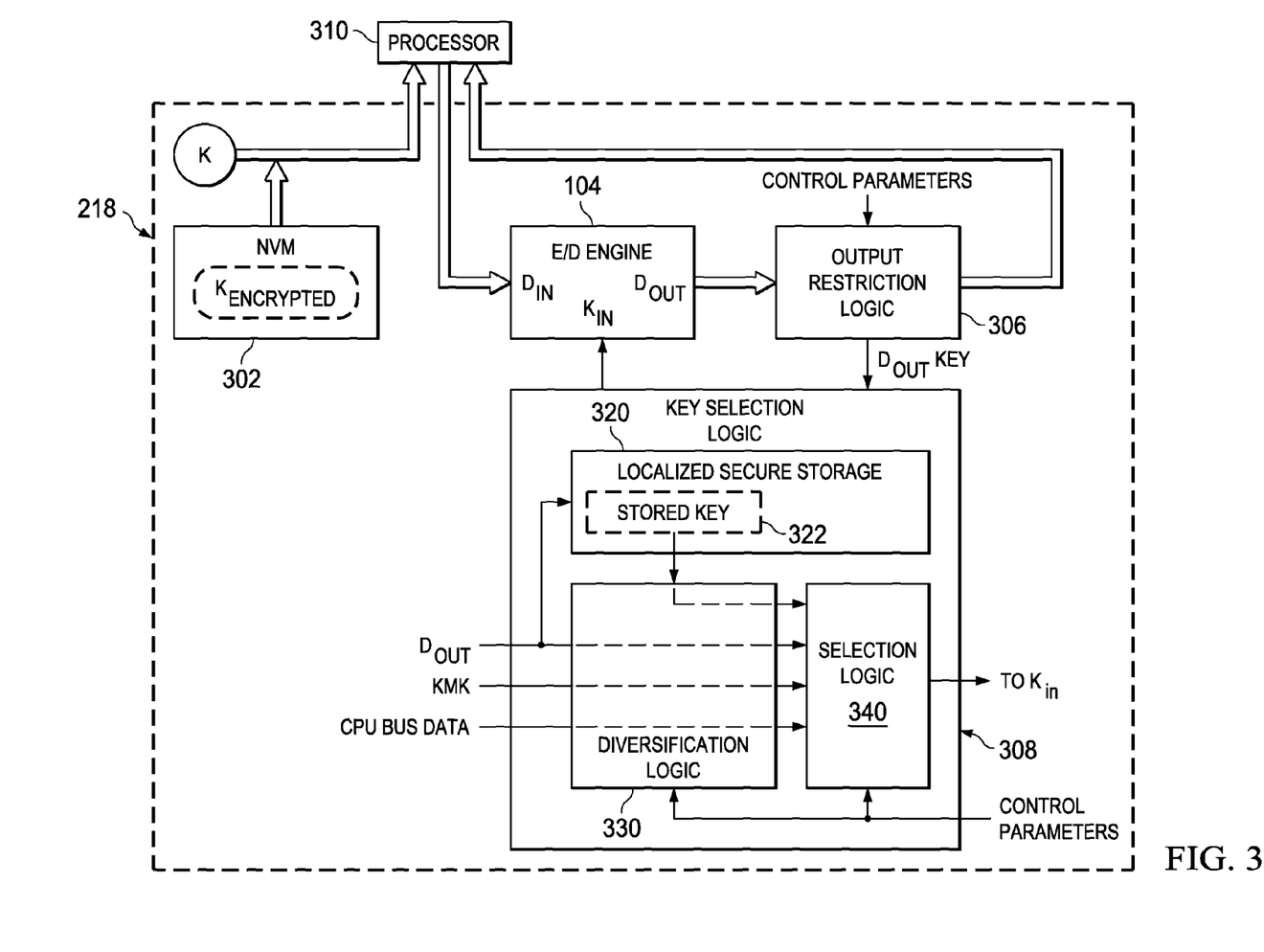
FIG. 3 illustrates security logic for use with a processor in accordance with an embodiment of the disclosure.

FIG. 3 illustrates security logic 218 for use with a processor 310 in accordance with an embodiment of the disclosure. The processor 310 may, for example, correspond to processor 214 or processor 228. As shown in FIG. 3, the security logic 218 comprises the E/D engine 104 coupled to output restriction logic 306 and key selection logic 308 to support the various modes described herein.

In accordance with at least some embodiments, the key selection logic 308 is responsible for providing the appropriate input key to the E/D engine 104 in accordance with a selected mode. For example, the key selection logic 308 may operate to forward a received key, a diversified version of the received key, a previously stored key, or a diversified version of the previously stored key to the key input line ($K_{IN}$) of the E/D engine 104. Thus, in accordance with at least some embodiments, the key selection logic 308 comprises a localized secure storage 320 having a stored key 322, which may have been derived previously by the E/D engine 104. The key selection logic 308 also comprises diversification logic 330 to diversify a received key or the stored key 322. Examples of received keys include a KMK or a key received as CPU bus data. Although not shown in FIG. 3, CPU bus data may selectively be stored in the localized secure storage 320 for later use by the key selection logic 308. Examples of the stored key 322 include $K_{app}$ or K. Examples of diversified keys, which may be output from the key selection logic 308, include KDK (a diversified version of KMK) and KPK (a diversified version of $K_{app}$).

With reference to FIG. 1 and FIG. 3, the key selection logic 308 may provide KMK to the E/D engine 104 for use with the key master mode 110. For the key diversification mode 120, the key selection logic 308 diversifies KMK and provides the result (KDK) to the key input line of the E/D engine 104. During the key diversification mode 120, $K_{app}$ is derived. Instead of forwarding $K_{app}$ to the processor 310, the output restriction logic 306 sends $K_{app}$ to the key selection logic 308 via the $D_{out}$ line for storage in the localized secure storage 320. For the $K_{app}$ mode 130, the key selection logic 308 retrieves $K_{app}$ from the localized secure storage 320 and forwards $K_{app}$ to the key input line of the E/D engine 104.

For the key protection mode 140, the key selection logic 308 diversifies $K_{app}$ and provides the result (KPK) to the key input line of the E/D engine 104. During the key protection mode 140, encryption may be performed by the E/D engine 104 to encrypt a key (K becomes $K_{encrypted}$). As part of the encryption process, the processor 310 may retrieve K from a memory location (e.g., random access memory (RAM)) and subsequently forward K to the data input line ($D_{IN}$) of the E/D engine 104 for encryption. Also during the key protection mode 140, decryption may be performed to decrypt an encrypted key ($K_{encrypted}$ becomes K). As part of the decryption process, the processor 310 may retrieve $K_{encrypted}$ from a non-volatile memory (NVM) 302 and subsequently forward $K_{encrypted}$ to the data input line of the E/D engine 104 for decryption. The NVM 302 may be a secure storage whose content is protected by an encryption scheme. Instead of forwarding the decrypted key (K) to the processor 310, the output restriction logic 306 sends K to the key selection logic 308 via the $D_{out}$ line for storage in the localized secure storage 320. The key selection logic 308 may subsequently retrieve K from the localized secure storage 320 and forward K to the key input line of E/D engine 104 for use in a non-restricted mode. The coordinated operation of the output restriction logic 306 and the key selection logic 308 is determined by control parameters.

Figure 4:
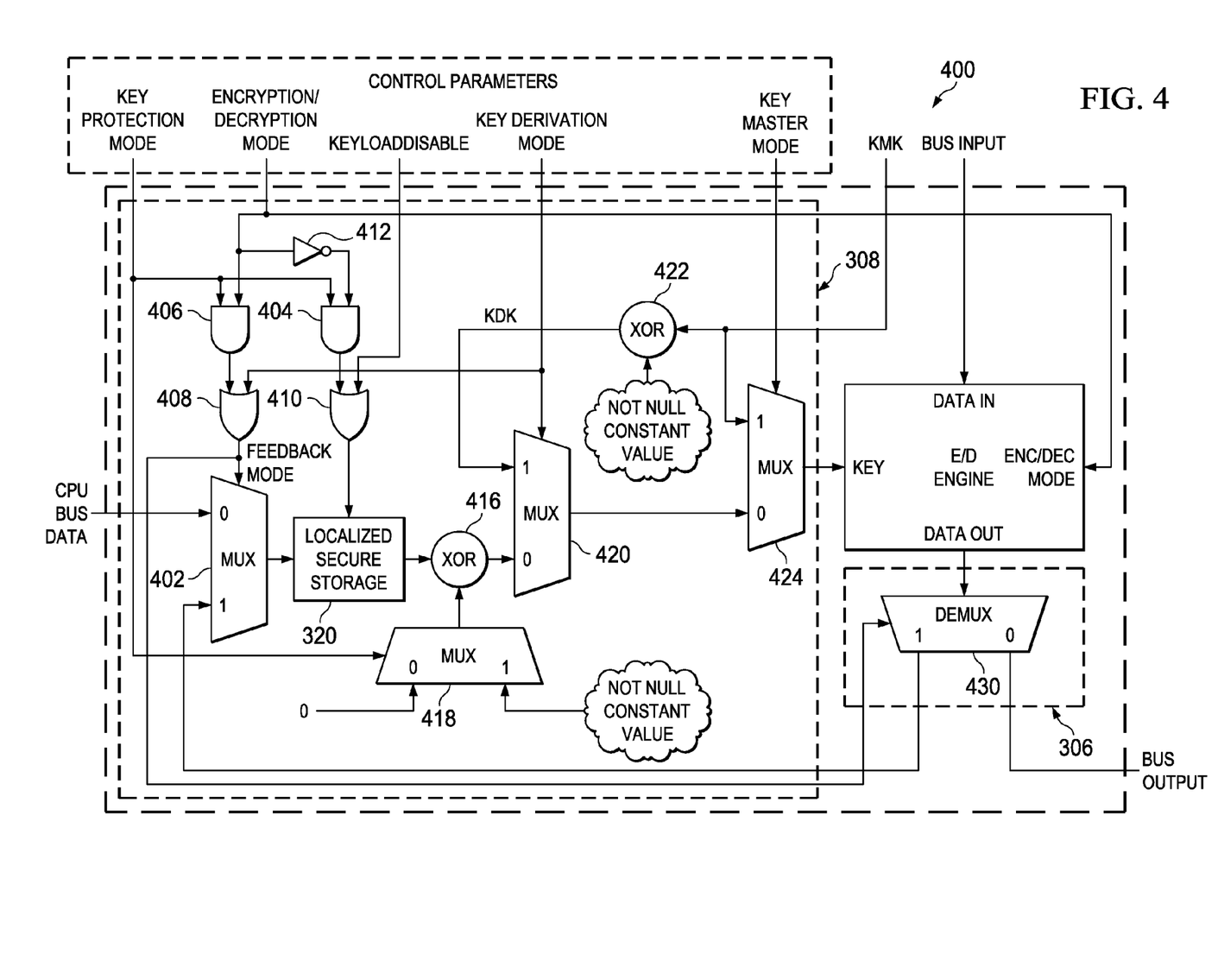
FIG. 4 illustrates various details of the security logic of FIG. 3 in accordance with an embodiment of the disclosure.

FIG. 4 illustrates various details of the security logic 218 of FIG. 3 in accordance with an embodiment of the disclosure. In the embodiment of FIG. 4, various hardware components for the output restriction logic 306 and the key selection logic 308 are illustrated. Also, a listing of control parameters (control signals) for the output restriction logic 306 and the key selection logic 308 are illustrated. In the embodiment of FIG. 4, the control parameters include a key protection mode signal, an encryption/decryption mode signal, a KeyLoadDisable signal, a key derivation mode signal, and a key master mode signal as will be described is greater detail below. It should be understood that the hardware configuration and control signals may vary for different embodiments.

For the embodiment of FIG. 4, the output restriction logic 306 comprises a demultiplexer 430 that selectively forwards an output of the E/D engine 104 to a bus output or to the key selection logic 308 based on a control signal referred to herein as the "Feedback_mode" signal. The Feedback_mode signal identifies whether a secure mode (e.g., the key derivation mode or the key protection mode) is selected. In other words, during a secure mode, the output of the E/D engine is provided to the key selection logic 308, which includes a feedback loop between the data output line and the key input line of the E/D engine 104. In accordance with embodiments, the Feedback_mode signal is asserted if a key protection mode signal is asserted (i.e., the key protection mode 140 is selected) and an encryption/decryption mode signal is set for decryption. Alternatively, the Feedback_mode signal is asserted if a key derivation mode signal is asserted (i.e., the key derivation mode 120 is selected). The value of the Feedback_mode signal varies based on the key protection mode signal, the encryption/decryption mode signal, and the key derivation mode signal as controlled, for example, by AND gate 406 and OR gate 408. As shown, the encryption/decryption mode signal is also provided to the E/D engine 104 to cause the E/D engine 104 to selectively perform encryption operations or decryption operations for input data received from a bus.

When the Feedback_mode signal is asserted, the demultiplexer 430 forwards the output of the E/D engine 104 to the key selection logic 308 instead of a bus. The Feedback_mode signal also controls the operation of multiplexer 402. Specifically, if the Feedback_mode signal is asserted, the multiplexer 402 forwards the output of the E/D engine 104 to the localized secure storage 320 (e.g., a register) for storage therein. Otherwise, if the Feedback_mode signal is de-asserted, the multiplexer 402 forwards CPU bus data to the localized secure storage 320 for storage therein. In at least some embodiments, the localized secure storage 320 may be disabled by a control signal. As shown, a KeyLoadDisable signal may directly disable key loads from the localized secure storage 320 via OR gate 410. Alternatively, the localized secure storage 320 is disabled based on the key protection mode signal being asserted and the encryption/decryption mode signal being set to encryption as controlled by AND gate 404, inverter 412, and OR gate 410.

When the localized secure storage 320 is not disabled, a key value stored therein may be output to XOR logic 416, which XORs the received value by a null value (to simply pass the received value) or a non-null value (to diversify the received value). As shown, a multiplexer 418 may select to provide a null value or a non-null value as input to the XOR logic 416 based on the key protection mode signal. Specifically, if the key protection mode signal is not asserted, a null value is provided to the XOR logic 416. Alternatively, if the key protection mode signal is asserted, a non-null value is provided to the XOR logic 416 to diversify the key stored in the localized secure storage 320 for use during the key protection mode.

The output of the XOR logic 416 is selectively input to the key input line of the E/D engine 104 via multiplexers 420 and 424. Specifically, if the key derivation mode signal is de-asserted, the multiplexer 420 forwards the output of the XOR logic 416 to the multiplexer 424 and, if the key master mode signal is de-asserted, the multiplexer 424 forwards the output of the XOR logic 416 to the E/D engine 104. Alternatively, if the key derivation mode signal is asserted, the multiplexer 420 forwards KDK to the multiplexer 424. As shown, KDK is derived by diversifying KMK using XOR logic 422 and a non-null value. Finally, the multiplexer 424 may alternatively forward KMK to the E/D engine 104 if the key master mode signal is asserted.

Figure 5:
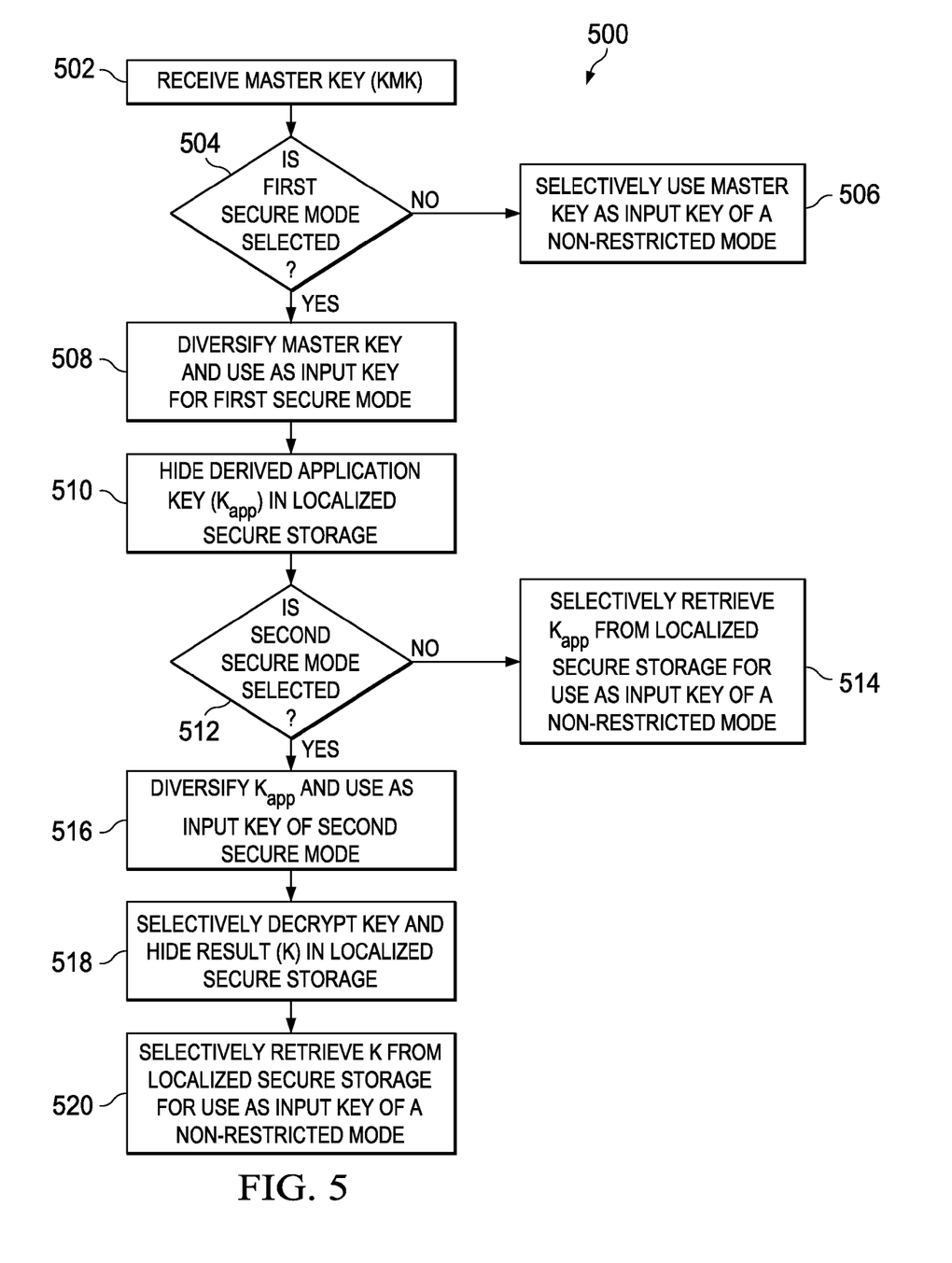
FIG. 5 illustrates a method for E/D engine modes in accordance with an embodiment of the disclosure.

FIG. 5 illustrates a method 500 for E/D engine modes in accordance with an embodiment of the disclosure. As shown, the method 500 comprises receiving a master key (e.g., KMK) at block 502. At decision block 504, the method 500 determines whether a first secure mode is selected. If not, the master key is selectively used as the input key for a non-restricted mode (block 506). If the first secure mode is selected at decision block 504, the master key is diversified and the diversified key (KDK) is used as the input key for the first secure mode (block 508). A derived application key ($K_{app}$) is then hidden (e.g., not output outside the security logic 218) in a localized secure storage accessible only to the E/D engine (block 510). In at least some embodiments, $K_{app}$ is output only to a feedback loop of an E/D engine for storage in the localized secure storage.

At decision block 512, the method 500 determines whether a second secure mode is selected. If not, $K_{app}$ is selectively retrieved from the localized secure storage for use as the input key of a non-restricted mode (block 514). If the second secure mode is selected at decision block 512, $K_{app}$ is diversified and the diversified key (KPK) is used as the input key for the second secure mode (block 516). At block 518, the method 500 selectively decrypts a key ($K_{encrypted}$) a hides the result (K) in a localized secure storage accessible only to the E/D engine (block 518). At block 520, K is selectively retrieved from the localized secure storage for use as the input key of a non-restricted mode.

Although FIG. 5 describes the master key (KMK) and $K_{app}$ as being used with non-restricted modes and describes diversified keys (e.g., diversified versions of KMK and $K_{app}$) being used with the secure modes, other embodiments are possible. For example, in alternative embodiments, KMK and $K_{app}$ may be used with the secure modes and diversified keys (e.g., diversified versions of KMK and $K_{app}$) may be used with the non-restricted modes.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. An electronic device, comprising:
   a processor; and
   an encryption/decryption (E/D) engine coupled to the processor via a bus,
   wherein the E/D engine selectively operates in a first mode and a second mode,
   wherein, for the first mode, an E/D engine output is provided to the bus,
   wherein, for the second mode, the E/D engine output is not provided to the bus and is accessible only to the E/D engine;
   wherein an input key selectively used with the first mode is diversified via exclusive or ("XOR") with a non-null value and wherein the diversified key is used as an input key for the E/D engine during the second mode; and
   wherein, during the second mode, an application key derived by the E/D engine is stored in a localized secure storage that forms part of a feedback loop between an output line of the E/D engine and a key input line of the E/D engine.

2. The electronic device of claim 1 wherein an input key selectively used with the second mode is diversified and wherein the diversified key is used as an input key for the E/D engine during the first mode.

3. The electronic device of claim 1 wherein, for a third mode, the application key is retrieved from the localized secure storage for use as the input key of the E/D engine and wherein, during the third mode, the E/D engine output is provided to the bus.

4. The electronic device of claim 1 wherein, for a third mode, the application key is retrieved from the localized secure storage and is diversified for use as the input key of the E/D engine and wherein, during the third mode, the E/D engine output is provided to the bus.

5. The electronic device of claim 1 wherein, for a fourth mode, the application key is retrieved from the localized secure storage and is diversified for use as the input key of the E/D engine and wherein, during the fourth mode, the E/D engine output is provided to the bus if the E/D engine performs an encryption operation and is not provided to the bus if the E/D engine performs a decryption operation.

6. The electronic device of claim 1 wherein, for a fourth mode, the application key is retrieved from the localized secure storage for use as the input key of the E/D engine and wherein, during the fourth mode, the E/D engine output is provided to the bus if the E/D engine performs an encryption operation and is not provided to the bus if the E/D engine performs a decryption operation.

7. Security logic, comprising:
   an encryption/decryption (E/D) engine having a data input line, a data output line, and a key input line;
   output restriction logic coupled to the data output line, the output restriction logic selectively prevents an E/D engine output from being forwarded outside the security logic;
   a feedback loop between the data output line and the key input line, wherein the feedback loop couples to the output restriction logic and selectively forwards the E/D engine output to the key input line;
   key selection logic that selectively diversifies a stored key via exclusive or ("XOR") with a non-null value and forwards the diversified key to the key input line; and wherein an application key derived by the E/D engine is stored in a localized secure storage that forms part of the feedback loop between the data output line of the E/D engine and the key input line of the E/D engine.

8. The security logic of claim 7 wherein the output restriction logic comprises a demultiplexer that selectively directs the E/D engine output toward a data bus outside the security logic.

9. The security logic of claim 7 wherein the feedback loop comprises the key selection logic and wherein the key selection logic selects one of a plurality of keys for input to said key input line.

10. The electronic device of claim 9 wherein the key selection logic comprises the localized secure storage that selectively stores the E/D engine output.

11. The security logic of claim 10 wherein the key selection logic selectively forwards the key stored in the localized secure storage to the key input line.

12. The security logic of claim 9 wherein the key selection logic receives a master key and diversifies the master key and wherein the key selection logic selectively forwards the master key or the diversified master key to the key input line.

13. The electronic device of claim 9 wherein the key selection logic comprises a set of multiplexers that forward one a plurality of keys to the key input line based on mode selection signals, the plurality of keys corresponding to a key master key (KMK), a diversified KMK, the application key ($K_{app}$) and a diversified $K_{app}$.

14. The security logic of claim 13 wherein the mode selection signals comprise a first secure mode signal, a second secure mode signal, and an encryption/decryption mode signal.

15. A method for encryption/decryption (E/D) engine modes, comprising:
   determining if a secure mode is selected;
   if the secure mode is selected, hiding an output of the E/D engine in a feedback loop accessible only by the E/D engine;
   using a key for the secure mode and diversifying the key via exclusive or ("XOR") with a non-null value for use during a non-restricted mode, and
   wherein, during the secure mode, an application key derived by the E/D engine is stored in a localized secure storage that forms part of the feedback loop between an output line of the E/D engine and the key input line of the E/D engine.

16. The method of claim 15 further comprising using the key for a non-restricted mode and diversifying the key for use during the secure mode.

\* \* \* \* \*